(12) United States Patent
Lindoff et al.

(10) Patent No.: US 8,630,334 B2
(45) Date of Patent: Jan. 14, 2014

(54) METHOD AND ARRANGEMENT OF SELECTING A CQI VALUE BASED ON THE TRANSPORT BLOCK SIZE IN A MOBILE TELECOMMUNICATION NETWORK

(75) Inventors: Bengt Lindoff, Bjärred (SE); Matthias Kamuf, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 323 days.

(21) Appl. No.: 12/997,024

(22) PCT Filed: Jun. 8, 2009

(86) PCT No.: PCT/EP2009/057027
§ 371 (c)(1),
(2), (4) Date: May 5, 2011

(87) PCT Pub. No.: WO2009/150123
PCT Pub. Date: Dec. 17, 2009

(65) Prior Publication Data
US 2011/0206098 A1    Aug. 25, 2011

Related U.S. Application Data

(60) Provisional application No. 61/077,275, filed on Jul. 1, 2008.

(30) Foreign Application Priority Data

Jun. 11, 2008  (EP) ..................................... 08104361

(51) Int. Cl.
*H04B 1/38*    (2006.01)
*H04B 15/00*   (2006.01)

(52) U.S. Cl.
USPC ............................................ 375/220; 375/285

(58) Field of Classification Search
USPC .................................. 375/219, 260, 285, 220
See application file for complete search history.

(56) References Cited

U.S. PATENT DOCUMENTS

| | | | | |
|---|---|---|---|---|
| 2004/0082353 | A1* | 4/2004 | Kekki ........................... | 455/522 |
| 2006/0007896 | A1* | 1/2006 | Grieco ......................... | 370/335 |
| 2007/0281728 | A1* | 12/2007 | Charriere et al. ............. | 455/522 |
| 2011/0286353 | A1* | 11/2011 | Blanz et al. .................. | 370/252 |
| 2012/0026904 | A1* | 2/2012 | Pietraski ....................... | 370/252 |

FOREIGN PATENT DOCUMENTS

| | | |
|---|---|---|
| EP | 1 519 524 A2 | 3/2005 |
| EP | 1 919 114 A1 | 5/2008 |
| WO | 2004/112288 A1 | 12/2004 |
| WO | 2008/041168 A2 | 4/2008 |

OTHER PUBLICATIONS

PCT International Search Report, mailed Sep. 14, 2009, in connection with International Application No. PCT/EP2009/057027.
"Summary of email discussion on CQI Reporting" R1-080049. 3GPP TSG RAN WG1 Meeting #51bis, Sevilla, Spain, Jan. 14-18, 2008.

(Continued)

*Primary Examiner* — Don N Vo
(74) *Attorney, Agent, or Firm* — Potomac Patent Group PLLC

(57) ABSTRACT

The present invention comprises methods and arrangements for selecting a CQI value based on an estimated or actual transport block size. This is achieved according to an embodiment by mapping the SIR value to a CQI value based on an indication of the expected transport block size to be received by the receiver.

26 Claims, 9 Drawing Sheets

(56) References Cited

OTHER PUBLICATIONS

3GPP TS 36.212, V8.1.0, Technical Specification Group Radio Access Network; Evolved Universal Terrestrial Radio Access (E-UTRA); Multiplexing and channel coding (Release 8), Nov. 2007.

Chinese Office Action, dated Apr. 12, 2013, in connection with Chinese Patent Application No. 200980122420.4 (see translation below).

Translation of Chinese Office Action, dated Apr. 12, 2013, in connection with Chinese Patent Application No. 200980122420.4.

* cited by examiner

METHOD AND ARRANGEMENT OF SELECTING A CQI VALUE BASED ON THE TRANSPORT BLOCK SIZE IN A MOBILE TELECOMMUNICATION NETWORK

CROSS-REFERENCE TO RELATED APPLICATIONS

This application claims priority under 35 U.S.C. §119 to European Patent Application No. 08104361.4, filed Jun. 11, 2008, which is hereby incorporated herein by reference in its entirety. This application also claims the benefit of U.S. Provisional Application No. 61/077,275, filed Jul. 1, 2008, which is hereby incorporated herein by reference in its entirety.

TECHNICAL FIELD

The present invention relates to method and arrangement of a mobile telecommunication network, and in particular to a solution for taking different characteristics of the provided service into account when allocating required radio resources.

BACKGROUND

The Universal Mobile Telecommunication System (UMTS) Terrestrial Radio Access Network (UTRAN) is a radio network of a UMTS system which is one of the third-generation (3G) mobile communication technologies, which provides circuit switched and packet switched services.

Evolved UMTS Terrestrial Radio Access Network (E-UTRAN), also referred to as LTE. Long Term Evolution is standardized by 3GPP Long Term Evolution (LTE) which is a project within the 3rd Generation Partnership Project (3GPP) to improve the Universal Mobile Telecommunication System (UMTS) standard with High Speed Packet Access functionality to cope with future requirements in terms of improved services such as higher data rates, improved efficiency, lowered costs etc.

An E-UTRAN typically comprises user equipments (UE) 100 wirelessly connected to radio base stations 200 a-d as illustrated in FIG. 1. In E-UTRA, Orthogonal Frequency Division Multiple (OFDM) is the access type that is used for the radio connection between the UE and the radio base station. Further, the radio base stations 200 a-d are directly connected to the core network (CN) 150 e.g. via an MME. In addition, the radio base stations 200 a-d are also connected to each other via an interface. The radio base stations are usually referred to as NodeB in UTRAN and to eNodeB in E-UTRAN.

The performance of packet based mobile networks relies on efficient channel-dependent scheduling. The network performs resource allocation or fast scheduling in the downlink by taking into consideration reported channel quality indicator (CQI) values from the UE. The CQI measurement is derived from the Signal to Interference and Noise Ratio (SIR) measured on a common reference or pilot symbols. An accurate channel quality indicator (CQI) at the eNodeB scheduler is crucial for successful operation of a packet based network such as LTE. It is important that the CQI is well-defined such that the scheduler has good knowledge of which transport formats a channel to a certain UE can support. For LTE, it has been decided that the CQI should correspond to a recommended transport format, presumably corresponding to some fixed block error rate (BLER) target.

In LTE, the CQI can be reported with several granularities, basically on a wideband or sub-band basis. If the CQI is reported on a wideband basis, one out of 16 CQI values is selected for the entire system bandwidth based on a measured SIR. Further, if the CQI is reported on a sub-band basis, one out of 16 different CQI values is selected for each sub-band. A sub-band is a pre-determined number of resource blocks, wherein a resource block is a physical resource on which data and control information can be transmitted. For example, a physical resource block may comprise a number of frequencies used during a limited time period. It should however be noted that it is up to the network/eNodeB to configure the CQI parameters, i.e., whether only wideband CQI should be reported or if a CQI down to the level of one or a few resource blocks should be reported.

Transmission parameters may be changed adaptively in order to adapt the transmission to the current interference situation, referred to as link adaptation. The link adaptation is performed based on e.g. reported and measured CQI. As mentioned above, the CQI reports comprise an indication of the signal to noise plus the interference ratio of the reference symbols over the frequency range. In the downlink (DL), the UE measures on pre-determined reference signals and reports CQI and power measurements, and provides information on how the channel quality differs over the frequency band. In the uplink (UL), the radio base station measures the quality of the received signal. If the UE also recently has used other parts of the frequency band, a certain awareness of the frequency dependency may be available to the radio base station. The CQI reports and the received signal level reports are then used to determine a suitable modulation and coding scheme (MCS), which is referred to as link adaptation. A MCS comprises coding scheme, bit rate, modulation, MIMO (Multiple Input Multiple Output) setting etc. The link adaptation is done separately per UE, and repeated for every n:th sub frame, which means that the scheduler needs to do link adaptation on all UEs. (In LTE networks the subframe is 1 ms.)

The SIR is estimated over a certain number of resource blocks (RBs). Then the SIR is mapped to a value for the CQI, for the same number of resource blocks as the estimated SIR. Given the actual bandwidth the CQI is reported for, the proposed MCS is in turn translated to a transport block size (TBS) based on the MCS and number of information data bits to be transmitted. However, the BLER (block error rate) depends on the actual TBS as will be described briefly in the following.

In LTE networks turbo codes are used for user data carried by the PDSCH and it is known that the error correcting performance of turbo codes depends on the size of the block that is processed. This is due to the "gain" introduced by the interleaver, which in a classical turbo coding setup with two parallel concatenated recursive systematic encoders separated by an interleaver as shown in FIG. 2 grows with increasing block size.

Hence, the BLER at a certain SIR for a specific channel is varying with the size of the transport block. Accordingly, small packets experience a different behavior in terms of BLER than large packets (e.g., "best-effort data" as in background-download services) for a given SIR.

Accordingly, there is a need for a solution taking the different behaviors of transport block with different sizes into account.

SUMMARY

The object of the present invention is thus to be able to take the different behaviors of transport block with different sizes into account when allocating resources for future transmissions.

The object is achieved according to the present invention by selecting or adjusting a CQI value based on an estimated or actual transport block size.

In accordance with a first aspect of the present invention a method for a first transceiver wirelessly connectable to a second transceiver in a mobile telecommunication network is provided. In the method information indicative of a quality of a channel between the first and the second transceiver is acquired. Information indicative of transport block size to be transmitted between the first and the second transceiver is further acquired, and the acquired information indicative of the quality of a channel between the first and the second transceiver is mapped or adjusted to a channel quality indicator based on the acquired information indicative of transport block size to be transmitted between the first and the second transceiver.

In accordance with a second aspect of the present invention a first transceiver wirelessly connectable to a second transceiver in a mobile telecommunication network is provided. The transceiver comprises means for acquiring information indicative of a quality of a channel between the first and the second transceiver and means for acquiring information indicative of transport block size to be transmitted between the first and the second transceiver. Furthermore, means for mapping or adjusting the acquired information indicative of a quality of a channel between the first and the second transceiver to a channel quality indicator is provided. The mapping or adjusting is based on the acquired information indicative of transport block size to be transmitted between the first and the second transceiver.

An advantage with embodiments of the present invention is that TBS-dependent CQI reporting improves the overall system throughput by allowing are more efficient channel-dependent scheduling.

BRIEF DESCRIPTION OF THE DRAWINGS

The invention will in the following be described in more detail with reference to enclosed drawings, wherein.

DETAILED DESCRIPTION

Figure 1:
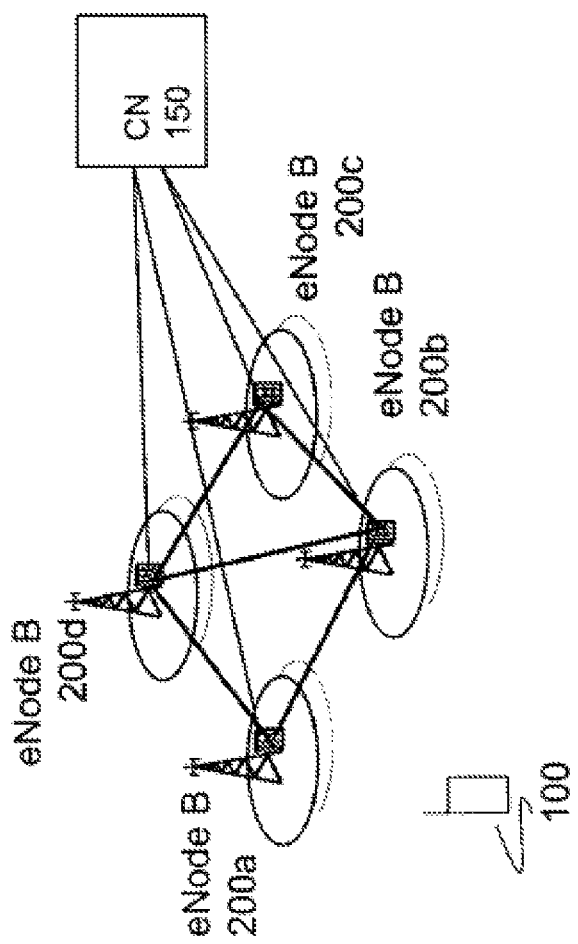
FIG. 1 illustrates schematically a wireless communication network wherein the present invention may be implemented.
Figure 2:
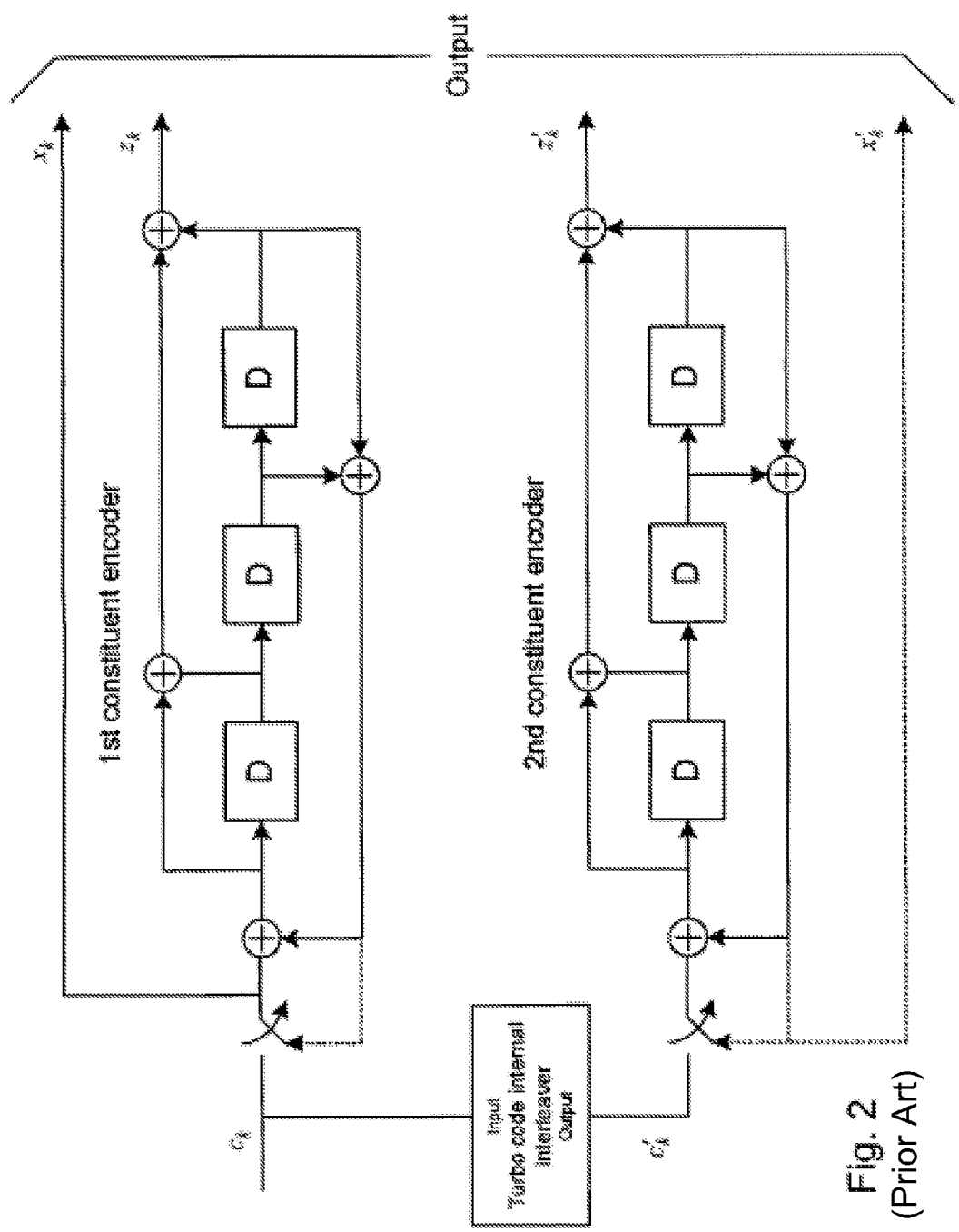
FIG. 2 illustrates a turbo encoder according to prior art.

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC) or an Field-Programmable Gate Array (FPGA). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above it is desired to able to take the different behaviors of transport block with different sizes into account when allocating resources for future transmissions. Thus, the present invention comprises methods and arrangements for selecting a CQI value based on an estimated or actual transport block size. This is achieved according to an embodiment by mapping the SIR value to a CQI value based on an indication of the expected transport block size to be received by the UE. The indication of the expected transport block size can e.g. be received from a database comprising previously used transport block sizes, or from the information of the currently used service. By using information of the currently used service it can be concluded that the transport block size will be small if the service is a Voice over IP related service and that the transport block size will be larger if it is a best effort service. Another indication of the transport block size is the sub-band CQI granularity. A small CQI granularity (i.e. many measurement values) indicates that it is desired to know which sub-bands (sub-carriers) are the best. This indicates that a small block will be sent.

Hence, at least two SIR to CQI mapping tables may be used. One for smaller transport block sizes (e.g. below 800 bits) and one for larger transport block sizes (e.g. above 800 bits).

According to another embodiment, an already determined CQI value is adjusted based on the transport block size.

By taking the transport block size into account when determining the CQI value, it is possible to increase the overall system throughput which yields an increased system capacity.

The method according to any of claims, wherein the step of mapping or adjusting is performed according to at least two tables, wherein one table is adapted for smaller TBS and at least a further table is adapted for larger TBS.

We now turn to FIGS. 3-5 which show flowcharts of the methods and schematically block diagrams of the arrangements according to embodiments of the present invention.

A mobile terminal 100 and a radio base station 200, respectively, comprises a transceiver. The mobile terminal 100 and the radio base station 200 may be connected by means of said transceivers comprising receivers, transmitters, and signal processing means in combination with other RF equipments such as antennas.

Figure 3A:
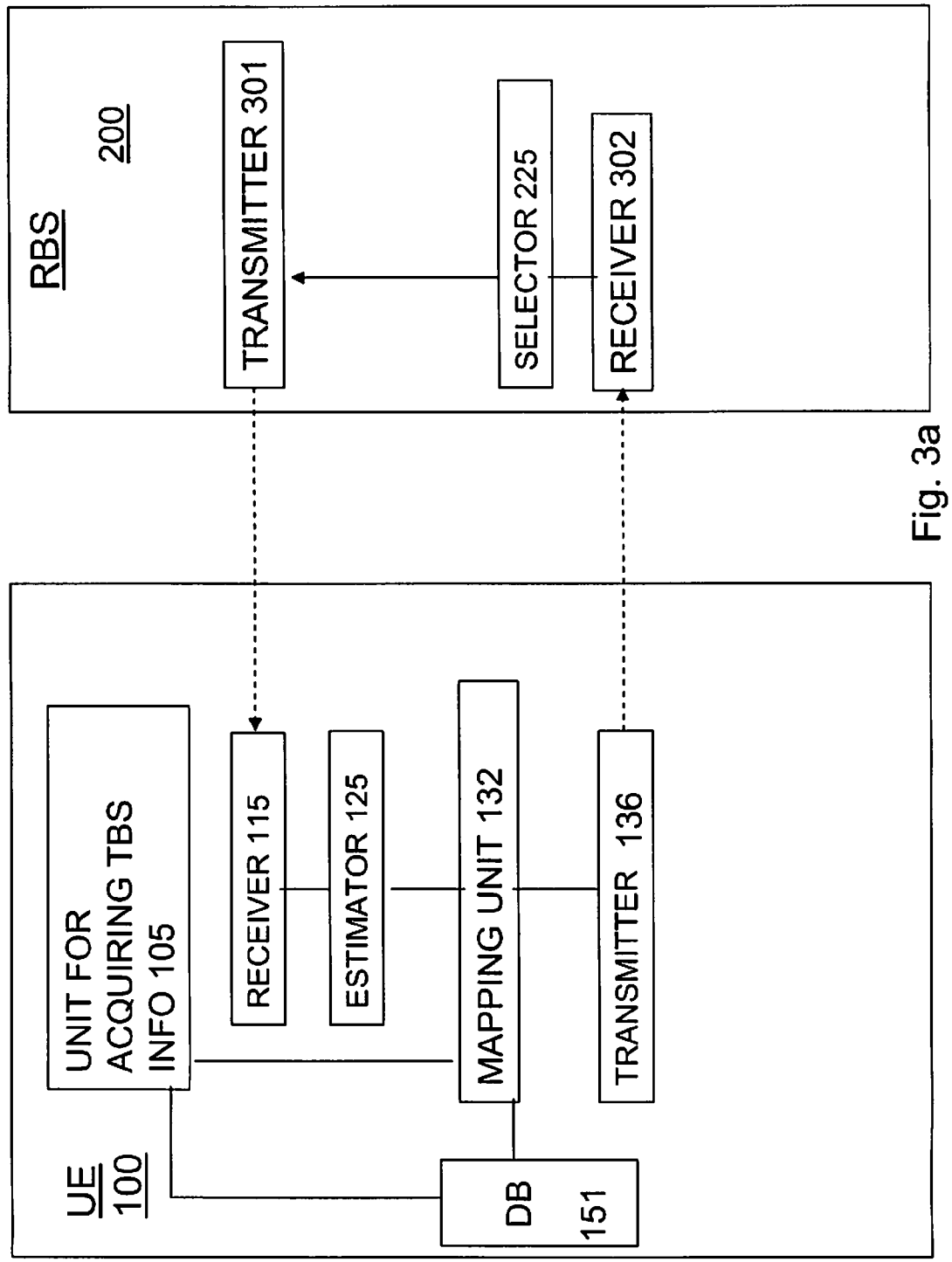
FIGS. 3a and 3b illustrate the embodiment of the present invention where a CQI value is selected based on an estimated or actual transport block size.

FIG. 3a illustrates a first embodiment where the mobile terminal 100 is in connected mode with the radio base station 200. The terminal 100 comprises a receiver for receiving 115 a signal from a transmitter 205 of the radio base station 200 and an estimator 125 for estimating one SIR value for each corresponding CQI BW (bandwidth). The SIR is estimated according to well-known techniques, such as utilizing known reference (pilot) symbols. In accordance with the present invention, the mobile terminal comprises means for acquiring 105 information indicative of an estimated transport block size. Such information may comprise information about the CQI bandwidth, i.e., the granularity (number of RBs) each CQI value should be reported for. Hence, the number of CQI values may vary between 1 (one CQI value for the entire bandwidth) to up to 100 (one CQI for every RB for a 20 MHz system bandwidth). The current used service may also indicate the transport block size. For instance, voice services result in small transport blocks and transport block sizes of "best effort" services will vary depending on SIR and scheduled resources. Alternatively to the information about current service, the terminal may also store the earlier received TBS in a database 151, giving a statistical distribution of TBS to predict the forthcoming TBS sizes and from that find the best SIR to CQI mapping. Accordingly, the terminal comprises means for mapping 132 the SIR to a CQI value based on the acquired information indicative of the transport block size. Once the CQI values are determined they are transmitted by the transmitter 136 to the radio base station 200 that uses the CQI for scheduling and selecting a suitable modulation and coding scheme. Hence, the radio base station comprises a receiver for receiving 302 the CQI, means for selecting 225 a modulation and coding scheme (MCS) based on the received CQI. Furthermore, the transmitter 301 of the radio base station comprises means for informing the mobile terminal about the selected coding scheme. Transport blocks with the selected MCS comprising data may then be transmitted by using the transmitter 301 to the receiver 302 of the mobile terminal 100.

Figure 4A:
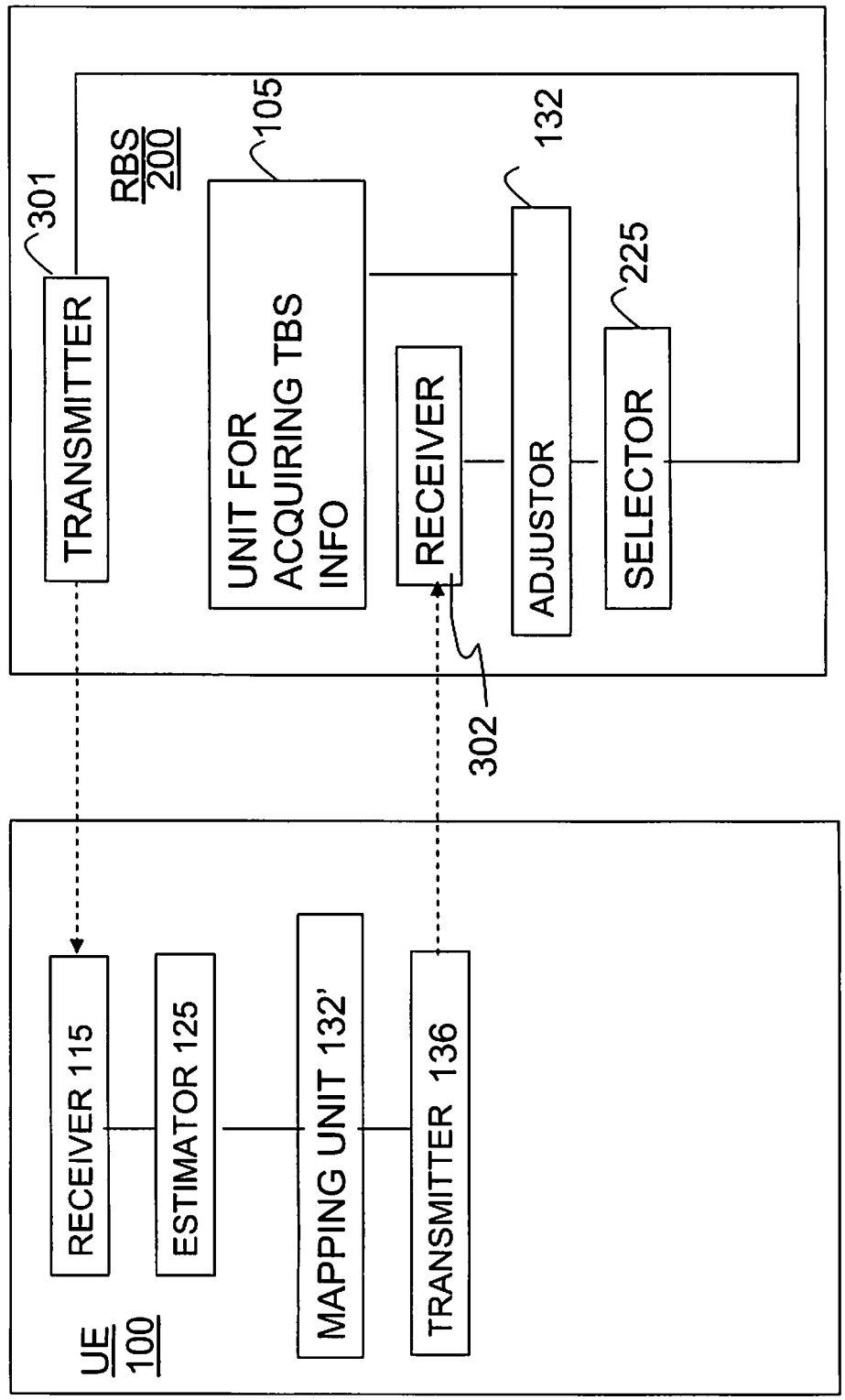
FIGS. 4a and 4b illustrate the embodiment of the present invention where an already determined CQI value is adjusted based on the transport block size.

FIG. 4a illustrates a second embodiment where the mobile terminal 100 is in connected mode with the radio base station. This embodiment differs from the first embodiment as illustrated in FIG. 3a in that the mobile terminal determines a CQI according to prior art while the radio base station comprises means for adjusting the CQI in accordance with the present invention.

The terminal 100 comprises a receiver 115 for receiving a signal from the transmitter 301 of the radio base station 200 and means for estimating 125 one SIR value for each corresponding CQI BW (bandwidth). The SIR is estimated according to well-known techniques, such as utilizing known reference (pilot) symbols. The mobile terminal 100 further comprises means for mapping 132' the SIR to a CQI value according to prior art. The determined CQI value is transmitted from the transmitter 136 of the mobile terminal to the receiver 302 of the radio base station 200. According to this embodiment, the radio base station 200 comprises means for acquiring 105 information indicative of transport block size. In this case, the radio base station is aware of the actual TBS that will be used. Based on this information, the radio base station 200 comprises means for adjusting 132 the CQI received from the mobile terminal 100. Once the CQI is adjusted, the adjusted CQI is forwarded to a selector 225 for selecting a coding scheme (MCS) based on the adjusted CQI. Furthermore, the transmitter 301 of the radio base station comprises means for informing the mobile terminal 100 of the selected coding scheme (MCS) and means for sending transport blocks with the selected coding scheme (MCS). Accordingly, the receiver 115 of the mobile terminal 100 comprises means for receiving information of the selected coding scheme and means for receiving the transport blocks.

Figure 4B:
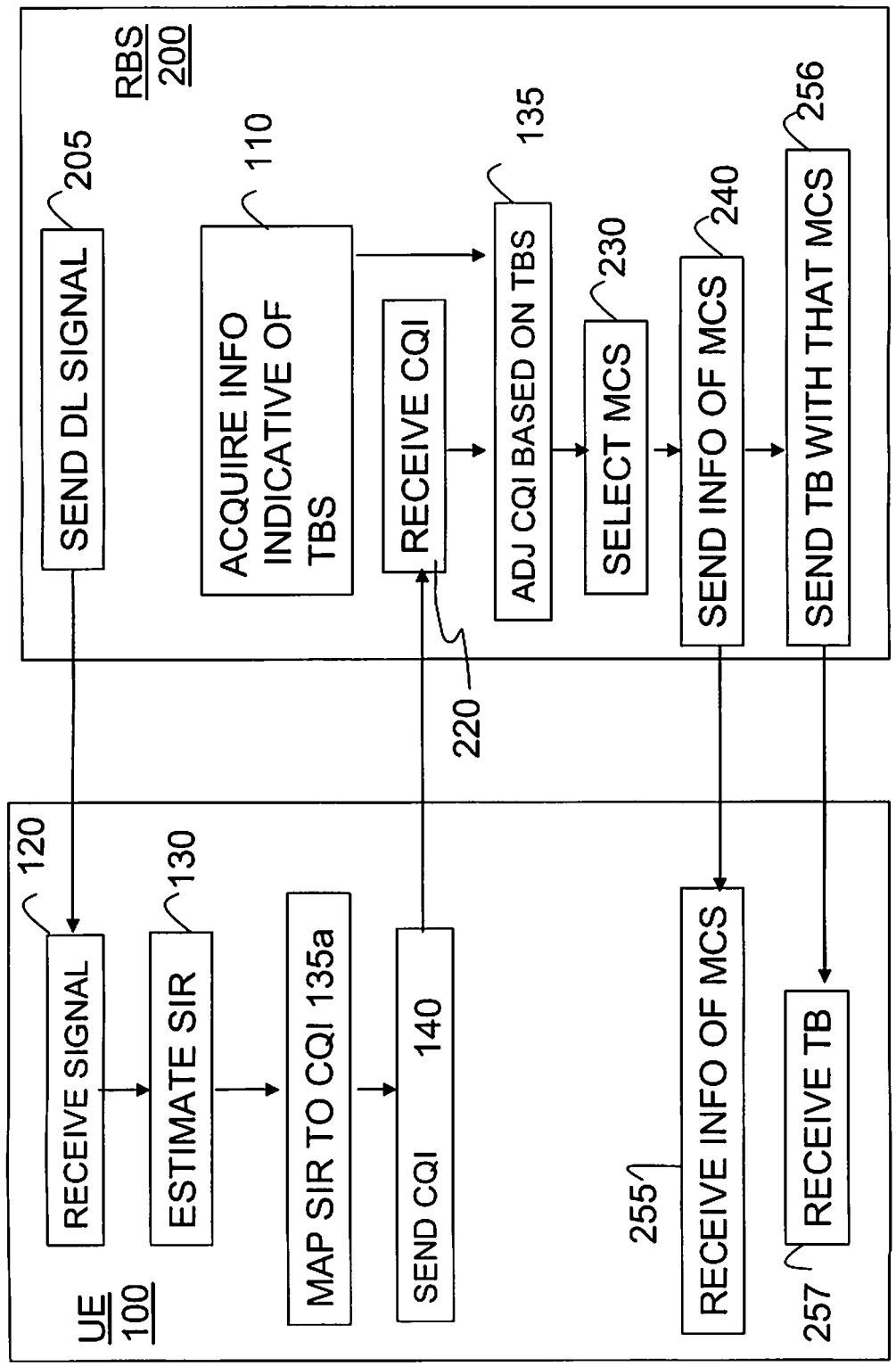
Figure 5A:
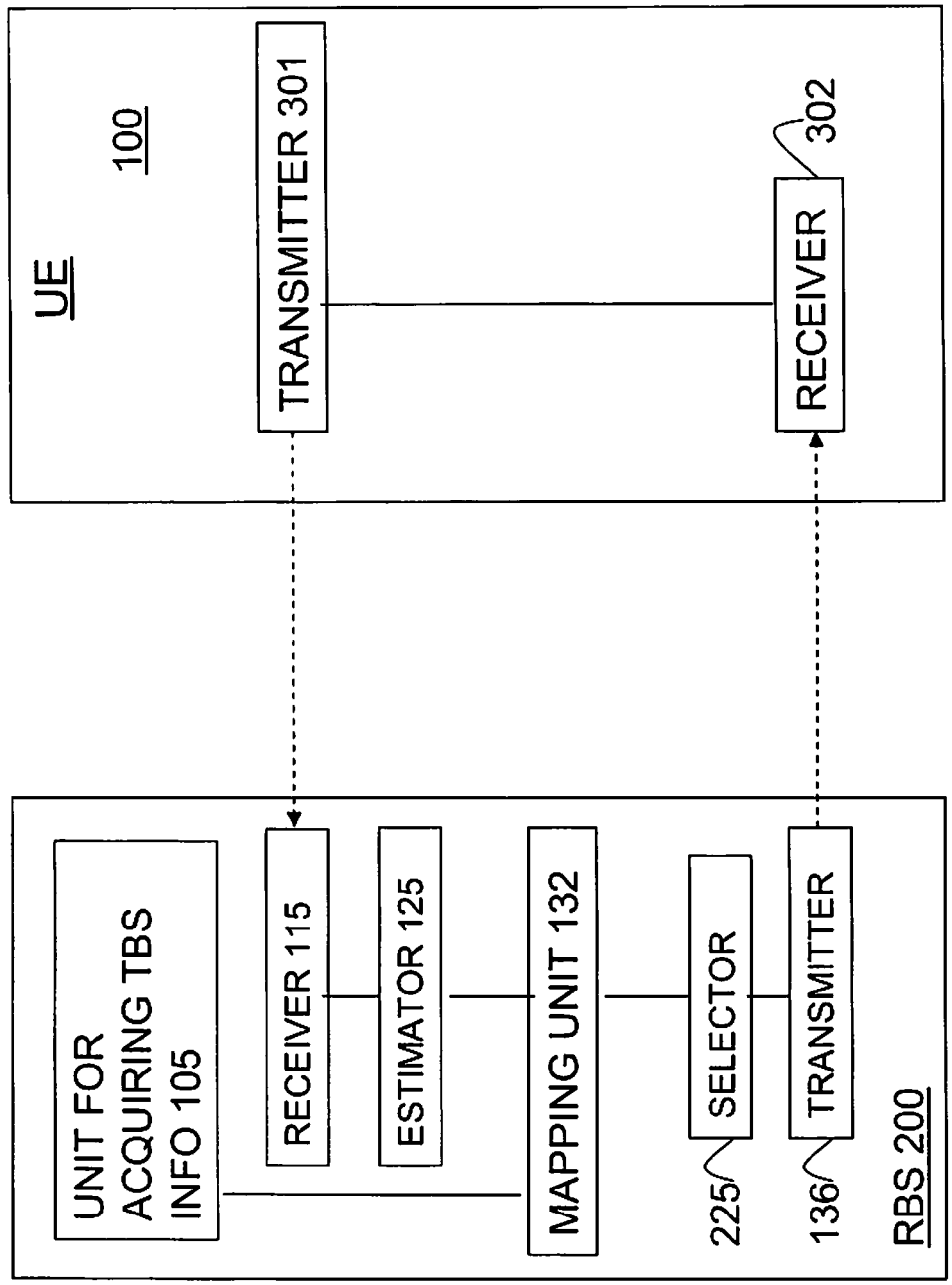
FIGS. 5a and 5b illustrate an embodiment of the present invention where a CQI value is selected based on an estimated or actual transport block size concerning the uplink direction.

FIG. 5a illustrates a third embodiment where the mobile terminal 100 is in connected mode with the radio base station 200. This embodiment differs from the first and second embodiments as illustrated in FIGS. 3 and 4 in that the third embodiment concerns the uplink direction while the first and second embodiments concern the downlink direction. However, the present invention may also be applicable to a UE centric system where the UE is the "master" and the radio base station the "slave". An LTE based system is a base station centric system, where the base station is the "master" and the UE is the "slave". For a UE centric system, the uplink and downlink change places in relation to the text related to FIGS. 3 and 4.

In this embodiment, the radio base station 200 comprises means for acquiring 105 information indicative of transport block size from the scheduling request. The receiver 115 of the radio base station 200 comprises means for receiving a scheduling request from the transmitter 301 of the mobile terminal 100. An estimator 125 for estimating one SIR value for each corresponding CQI BW (bandwidth) is also provided by the radio base station 200. The SIR is estimated according to well-known techniques, such as utilizing known reference (pilot) symbols as stated above. In accordance with the present invention, the radio base station 200 comprises means for mapping 132 the SIR to a CQI value based on the acquired information indicative of transport block size. Once the CQI is determined, a coding scheme is selected based on the determined CQI by the selector denoted 225. Furthermore, transmitter 136 of the radio base station comprises means for informing the mobile terminal about the selected coding scheme. Transport blocks with the selected MCS comprising data may then be transmitted by the transmitter 301 of the UE to the receiver 115 of the radio base station.

Figure 5B:
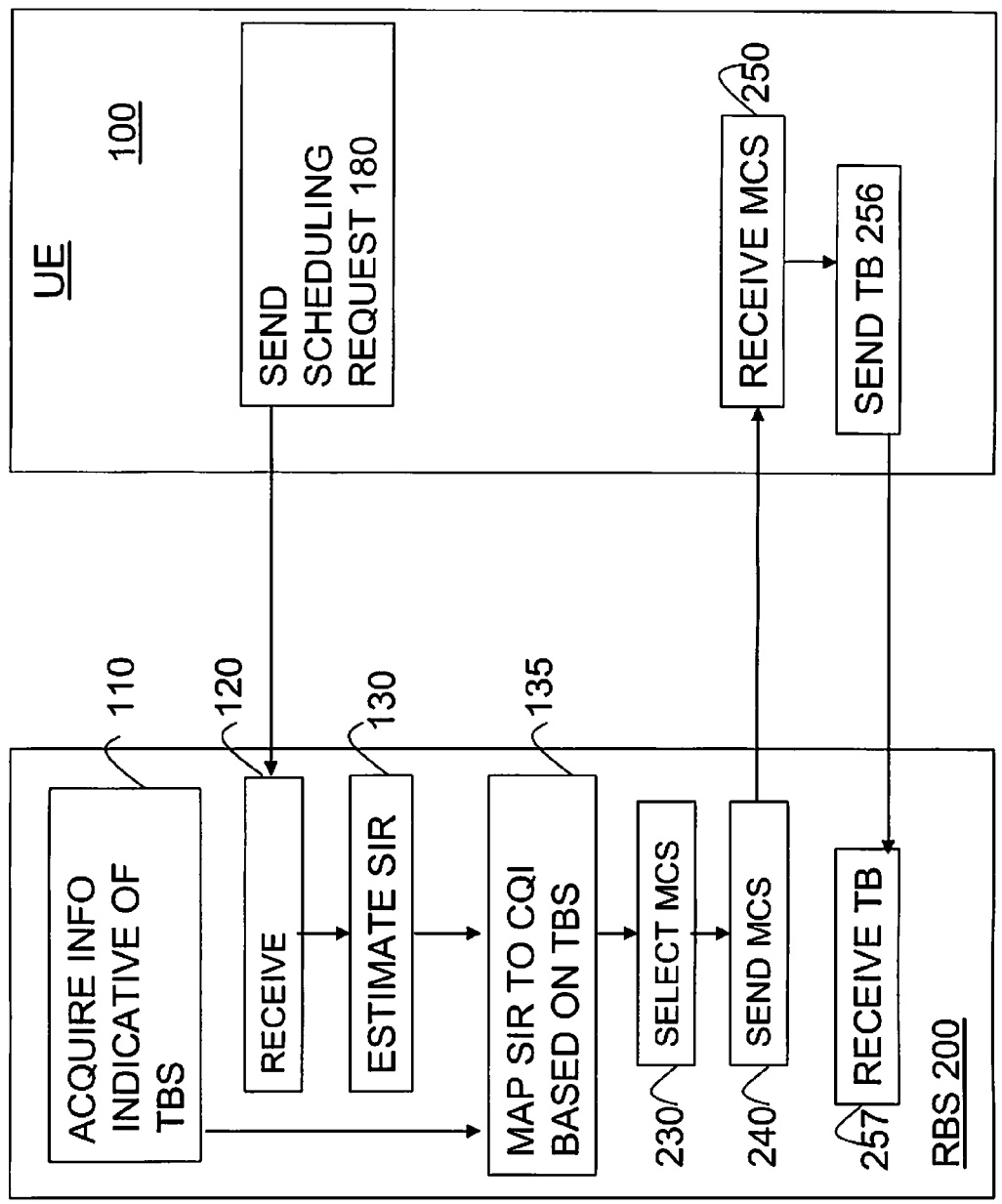
Figure 6:
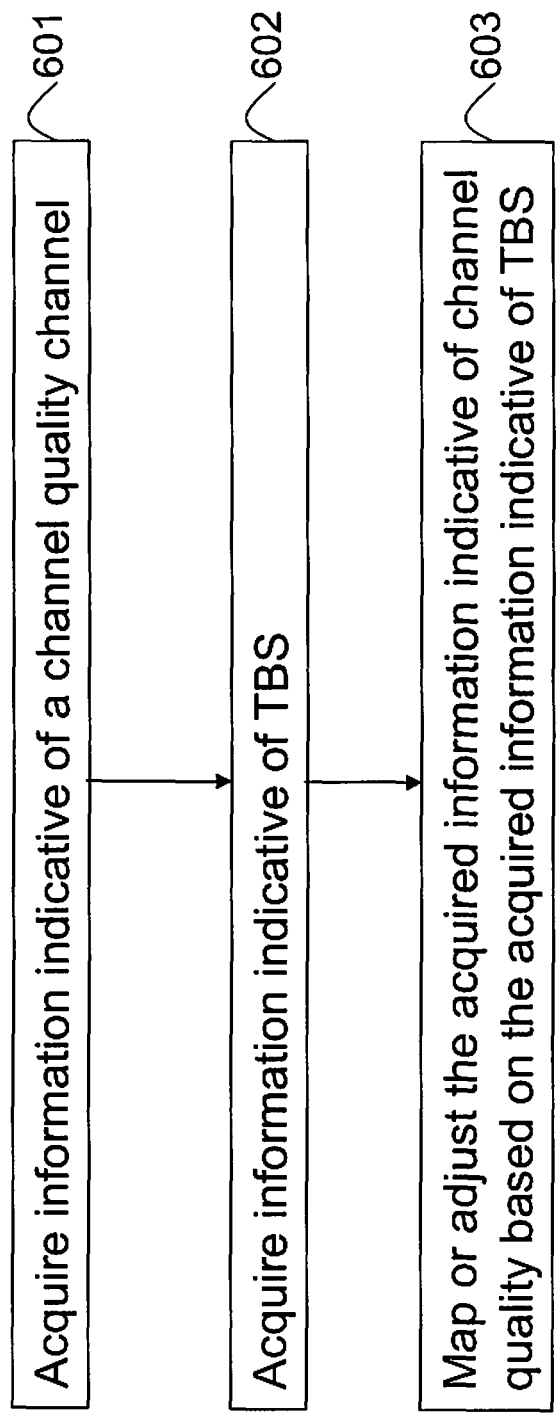
FIG. 6 is a flowchart of the method according to embodiments of the present invention.

The method according to the present invention is illustrated in the flowchart of FIG. 6. Further, with reference to FIGS. 3b, 4b and 5b, methods according to the first, second and third embodiments are provided, which will be described in more detail below. The method shown in FIG. 3b may be implemented in the arrangement illustrated in FIG. 3a, the method shown in FIG. 4b may be implemented in the arrangement illustrated in FIG. 4a, and the method shown in FIG. 5b may be implemented in the arrangement illustrated in FIG. 5a.

Hence a method for a first transceiver wirelessly connectable to a second transceiver in a mobile telecommunication network is provided as illustrated in the flowchart of FIG. 6. In a first step, information indicative of a quality of a channel between the first and the second transceiver is acquired 601 (corresponding to 130 in FIGS. 3b, 4b and 5b), and in a second step information indicative of transport block size to be transmitted between the first and the second transceiver is acquired 602 (corresponding to 110 in FIGS. 3b, 4b and 5b). The acquired information indicative of a quality of a channel between the first and the second transceiver is mapped or adjusted 603 (corresponding to 135 in FIGS. 3b, 4b and 5b) to a channel quality indicator based on the acquired information indicative of transport block size to be transmitted between the first and the second transceiver.

Figure 3B:
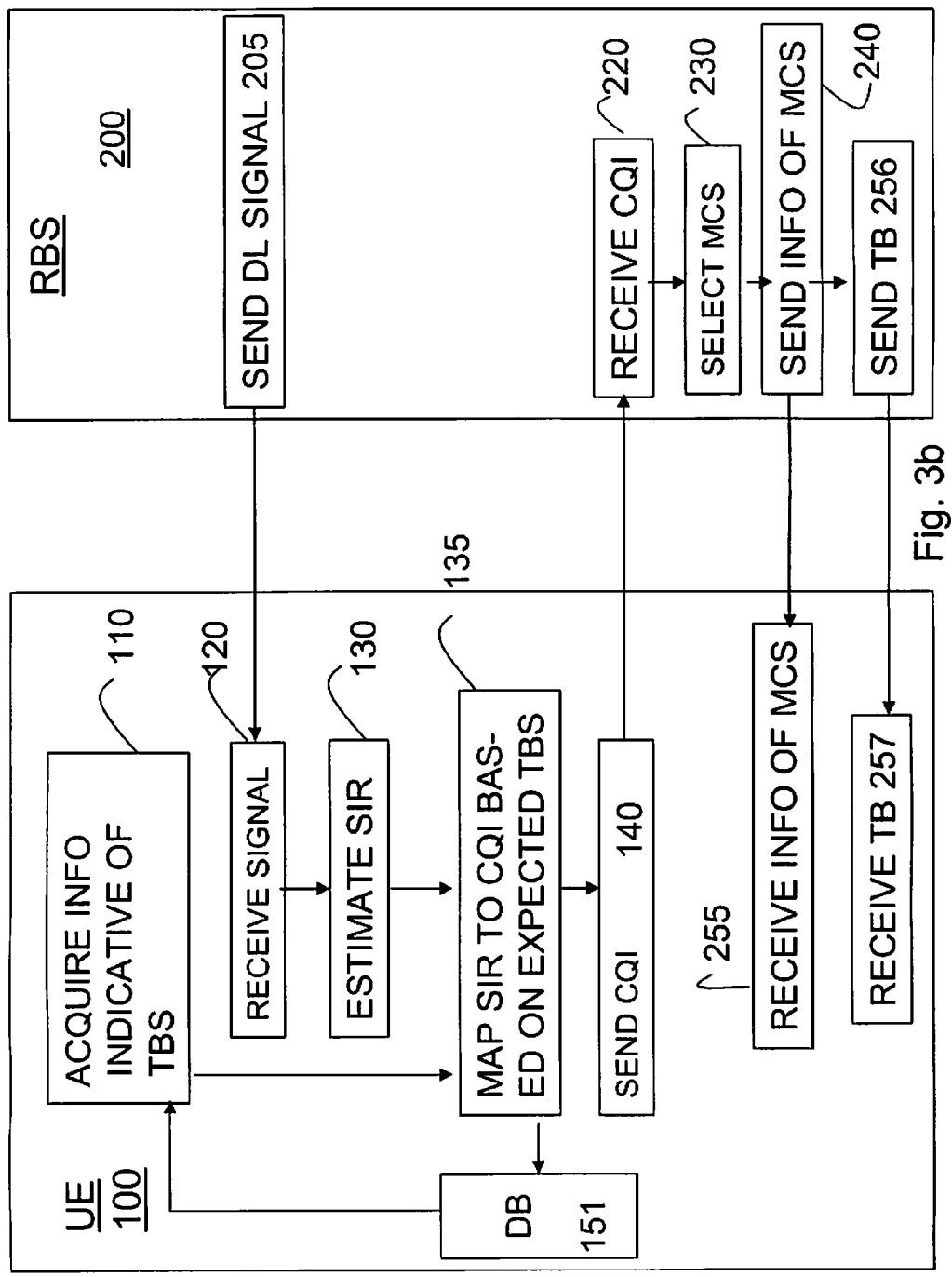

In accordance with the first embodiment disclosed in FIG. 3b, the first transceiver is implemented in a mobile terminal 100 and the second transceiver is implemented in a radio base station 200, which implies that the method is implemented in the UE 100. A downlink signal is sent 205 from the base station and received 120 at the mobile terminal. The step of acquiring 110 information indicative of a quality of a channel between the first and the second transceiver further comprises the step of estimating 130 signal-to-interference ratio based on a received downlink signal. The acquired information indicative of a quality of a channel between the first and the second transceiver is then mapped 135 to CQI based on an expected TB size. The Further, the channel quality indicator may be sent 140 and received 220 at the second transceiver. At the base station, an MCS is selected 230 and the MCS is sent 240 from the base station and received 255 at the mobile terminal. Finally the TB is sent 256 having the selected MCS and received 257 at the mobile terminal.

In accordance with the second embodiment disclosed in FIG. 4b, the first transceiver is implemented in a mobile terminal 100 and the second transceiver is implemented in a radio base station 200, which implies that the method is implemented in the radio base station 200. A downlink signal is sent 205 from the base station and received 120 at the mobile terminal. Then, the SIR is estimated 130 based on a received downlink signal. The estimated SIR is mapped 135a to a CQI according to prior art. This CQI is transmitted 140 from the mobile terminal and received 220 at the base station The CQI is adjusted 110 in the radio base station wherein the transport block size is taken into account, wherein the base station can acquire 110 information indicative of the transport block size. An MCS is selected 230 based on the adjusted CQI. Further, information of the MCS and transport blocks with that MCS are sent 240, 256 from the base station and received 255, 257 at the mobile terminal.

In accordance with the third embodiment disclosed in FIG. 5b the first transceiver is implemented in a radio base station and the second transceiver is implemented in a user equipment implying that the embodiment concerns the uplink scenario. A scheduling request is sent 205 from the mobile terminal and received 120 at the base station. The SIR ratio is estimated 130 based on a received uplink signal and info indicative of the TB size is acquired 110. The SIR is mapped to the CQI based on the TB size. In addition, the coding scheme 230 is selected based on the channel quality indicator, and the selected MCS implying a set of transport settings (bit rate etc.), are sent 235 and received 250 at the second transceiver of the mobile terminal. Hence, the radio base station sends both the MCS and the resource block assignment (i.e. number of available coded bits). These are based on the information in the scheduling request (e.g. how many bits does the UE want to send) sent by the UE. Accordingly, the TB with the selected MCS is sent 256 from the mobile terminal and received 257 at the base station.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for a first transceiver wirelessly connectable to a second transceiver in a mobile telecommunication network, the method comprising the steps of:
   acquiring information indicative of a quality of a channel between the first and the second transceiver;
   acquiring information indicative of transport block size (TBS) to be transmitted between the first and the second transceiver;
   selecting one of at least two SIR to CQI mapping tables based on the acquired information indicative of transport block size to be transmitted between the first and the second transceiver; and
   using the selected SIR to CQI mapping table to map or adjust the acquired information indicative of a quality of a channel between the first and the second transceiver to a channel quality indicator.

2. The method according to claim 1, wherein the step of acquiring information indicative of a quality of a channel between the first and the second transceiver further comprises the step of:
   estimating signal-to-interference ratio based on a received downlink signal.

3. The method according to claim 1, wherein the method further comprises the step of:
   sending the channel quality indicator to the second transceiver.

4. The method according to claim 1, wherein the first transceiver is implemented in a user equipment and the second transceiver is implemented in a radio base station.

5. The method according to claim 1, wherein the step of acquiring information indicative of a quality of a channel between the first and the second transceiver further comprises the step of:
   receiving a channel quality indicator.

6. The method according to claim 1, wherein the step of acquiring information indicative of a quality of a channel between the first and the second transceiver further comprises the step of:
   estimating signal-to-interference ratio based on a received uplink signal.

7. The method according to claim 6, wherein the method further comprises the steps of:
   selecting modulation and coding scheme (MCS) based on the channel quality indicator implying a set of transport settings; and
   sending the transport settings to the second transceiver.

8. The method according to claim 6, wherein the first transceiver is implemented in a radio base station and the second transceiver is implemented in a user equipment.

9. The method according to claim 1, wherein the information indicative of transport block size is historical data of earlier received transport block sizes.

10. The method according to claim 1, wherein the information indicative of transport block size is information of a current used service.

11. The method according to claim 1, wherein the first and the second transceiver operate according to Orthogonal frequency divisional multiplexing based system and the channel quality indicator indicates the channel quality indicator over a certain number of sub-carriers.

12. The method according to claim 11, wherein the information indicative of transport block size is information of the number of resource blocks each channel quality channel indicator is reported for.

13. The method according to claim 1, wherein the step of mapping or adjusting is performed according to at least two tables, wherein one table is adapted for smaller TBS and at least a further table is adapted for larger TBS.

14. A first transceiver wirelessly connectable to a second transceiver in a mobile telecommunication network, the transceiver comprising means for acquiring information indicative of a quality of a channel between the first and the second transceiver, means for acquiring information indicative of transport block size (TBS) to be transmitted between the first and the second transceiver, and means for selecting one of at least two SIR to CQI mapping tables based on the acquired information indicative of transport block size to be transmitted between the first and the second transceiver and using the selected SIR to CQI mapping table to map or adjust the acquired information indicative of a quality of a channel between the first and the second transceiver to a channel quality indicator.

15. The first transceiver according to claim 14, wherein the means for acquiring information indicative of a quality of a channel between the first and the second transceiver further comprises means for estimating signal-to-interference ratio based on a received downlink signal.

16. The first transceiver according to claim 14, wherein it further comprises means for sending the channel quality indicator to the second transceiver.

17. The first transceiver according to claim 14, wherein the first transceiver is implemented in a user equipment and the second transceiver is implemented in a radio base station.

18. The first transceiver according to claim 14, wherein the means for acquiring information indicative of a quality of a channel between the first and the second transceiver further comprises means for receiving a first channel quality indicator.

19. The first transceiver according to claim 14, wherein the means for acquiring information indicative of a quality of a channel between the first and the second transceiver further comprises means for estimating signal-to-interference ratio based on a received uplink signal.

20. The first transceiver according to claim 19, further comprising means for selecting modulation and coding scheme (MCS) based on the channel quality indicator implying a set of transport settings, and means for sending the transport settings to the second transceiver.

21. The first transceiver according to claim 19, wherein the first transceiver is implemented in a radio base station and the second transceiver is implemented in a user equipment.

22. The first transceiver according to claim 14, wherein the information indicative of transport block size is historical data of earlier received transport block sizes.

23. The first transceiver according to claim 14, wherein the information indicative of transport block size is information of a current used service.

24. The first transceiver according to claim 14, wherein the first and the second transceiver operate according to Orthogonal frequency divisional multiplexing based system and the channel quality indicator indicates the channel quality indicator over a certain number of sub-carriers.

25. The first transceiver according to claim 24, wherein the information indicative of transport block size is information of the number of resource blocks each channel quality channel indicator is reported for.

26. The first transceiver according to claim 14, wherein the means for mapping or adjusting is configured to use at least two tables, wherein one table is adapted for smaller TBS and at least a further table is adapted for larger TBS.

* * * * *

UNITED STATES PATENT AND TRADEMARK OFFICE
CERTIFICATE OF CORRECTION

| | | |
|---|---|---|
| PATENT NO. | : 8,630,334 B2 | Page 1 of 1 |
| APPLICATION NO. | : 12/997024 | |
| DATED | : January 14, 2014 | |
| INVENTOR(S) | : Lindoff et al. | |

It is certified that error appears in the above-identified patent and that said Letters Patent is hereby corrected as shown below:

In the Specification

In Column 4, Line 56, delete "transmitter 205" and insert -- transmitter 301 --, therefor.

In Column 7, Line 20, delete "scheduling request is sent 205" and insert -- scheduling request is sent 180 --, therefor.

Signed and Sealed this
Ninth Day of December, 2014

Michelle K. Lee
*Deputy Director of the United States Patent and Trademark Office*